June 24, 1958     E. J. ONDECK     2,839,952
REVERSIBLE POWER TOOL DRIVE ATTACHMENT
Filed Dec. 20, 1954     2 Sheets-Sheet 1
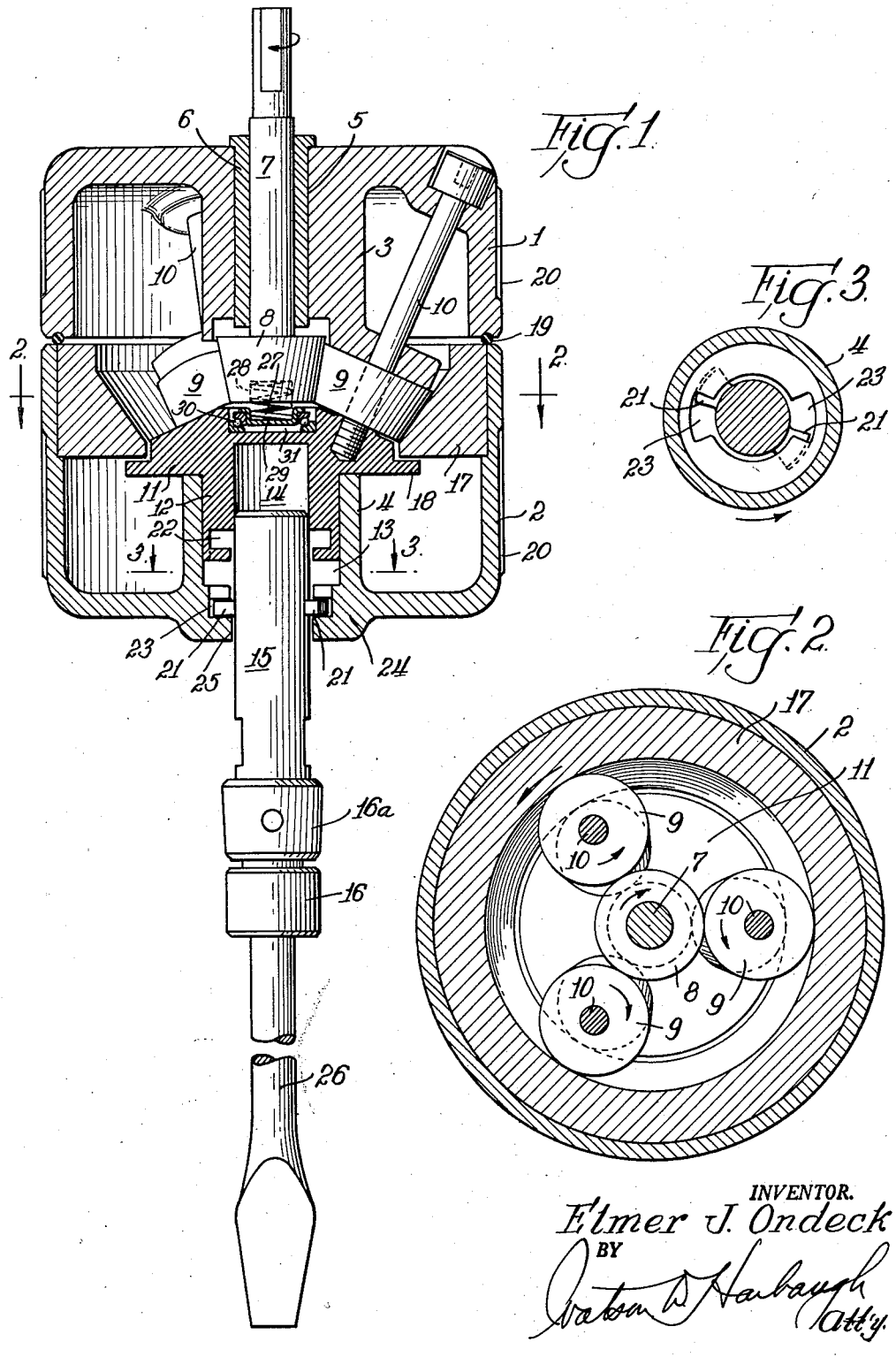
INVENTOR.
Elmer J. Ondeck

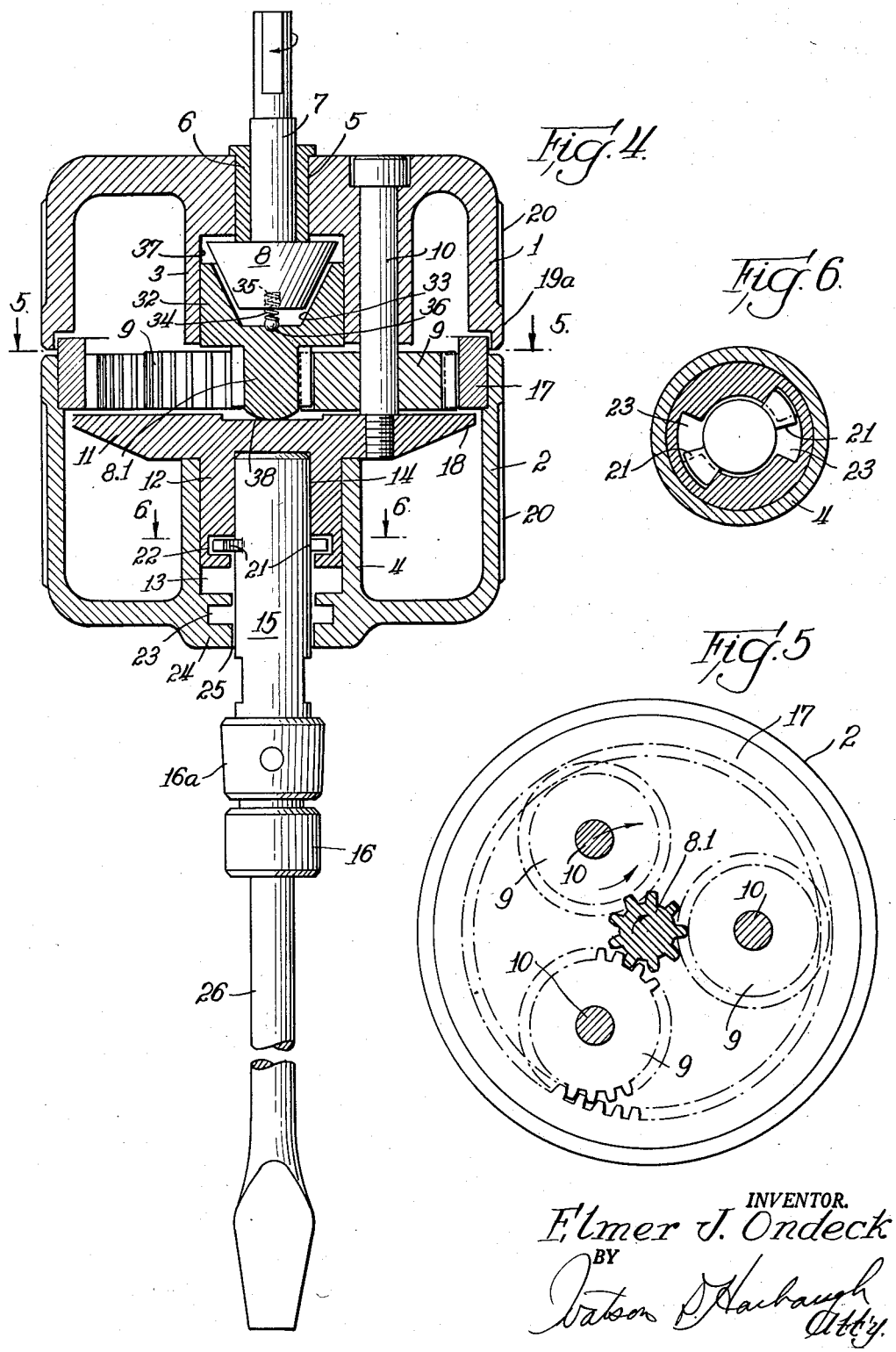

United States Patent Office 2,839,952
Patented June 24, 1958

2,839,952
REVERSIBLE POWER TOOL DRIVE ATTACHMENT

Elmer J. Ondeck, Brookfield, Ill., assignor, by mesne assignments, to Supreme Products Corporation, Chicago, Ill., a corporation of Illinois Application December 20, 1954, Serial No. 476,205

12 Claims. (Cl. 74—750)

This invention relates to reversible drive attachments for power tools such as motor driven screw drivers, drills, bolt tighteners and the like, having motors operable in one direction only, and particularly to improvements in such attachments whereby the direction of rotation of the driven element may be more conveniently controlled, selectively, at the will of the operator and whereby transmission or power through the device will start and stop automatically as the load is applied and released by the operator while the driving motor is in operation. More especially, this invention concerns improvements in the power transmission mechanism of reversible drive attachments such as that shown and described in my copending application Serial No. 412,716, filed February 26, 1954, issued as Patent No. 2,780,944 for Reversible Drive For Power Tools, to which application reference is hereby made for general details of the structure and operation of the particular device in connection with which the present invention is herein disclosed.

The main objects of this invention are to provide an improved power transmission means for attachments for motor driven hand tools; to provide an improved power transmission means for reversing attachments for hand tools driven by a unidirectional motor; to provide an improved torque drive in which power transmission to the driven element will occur only when load is applied and may be instantly checked or halted when the load is released; to provide an improved reversible torque drive in which power transmission to the driven element, in either selected direction, will start and stop automatically as load is applied and released; to provide an improved reversible torque drive attachment for hand tools with which reverse operation of the driven tool can be had quickly and without stopping the driving motor; and to provide such a device that is of simple but rugged construction and which can be readily manufactured at a relatively low cost.

A specific embodiment of this invention is shown in the accompanying drawings in which:

Fig. 1 is a sectional elevation of the improved attachment showing its construction and the relation of its parts;

Fig. 2 is a transverse sectional view of the same as taken on line 2—2 of Fig. 1;

Fig. 3 is a sectional view of the same as taken on line 3—3 of Fig. 1 to illustrate the unidirectional clutch arrangement for connecting the tool chuck shank to the lower one of the driven elements of the attachment, for left hand or counterclockwise rotation;

Fig. 4 is a sectional view like Fig. 1 but showing another form of the improved reversible torque transmission and with the parts engaged for clockwise rotation of the tool;

Fig. 5 is a transverse sectional view of the same as taken on line 5—5 of Fig. 4; and Fig. 6 is a sectional view, as taken on line 6—6 of Fig. 5, showing the clutch arrangement for engaging the tool chuck shank with the upper driven element of the attachment.

In the form shown in the drawings, the improved reversible torque transmission of this invention is embodied in a power tool attachment comprising first and second, or upper and lower, annular body sections 1 and 2 which are axially aligned with each other and suitably connected together for independent relative rotation. Each of the body sections is a hollow cup-shaped member and each has a central hub, 3 and 4 respectively, which projects axially inward from its end wall for supporting certain elements of the transmission mechanism. These cup-shaped members are disposed with their open ends face-to-face and together form a hollow cylindrical unit within which the transmission mechanism is wholly enclosed or housed.

As shown, the hub 3 of the body section 1 is axially bored as at 5 and a bushing or bearing 6 is press-fitted into the bore to journal a drive shaft 7 which carries a sun element 8 on its inner end. The shaft 7 is axially slidable in the bushing 6 and projects outwardly from the body section 1 for connection with a driving motor, not shown, as by means of the usual chuck carried by the shaft extension of a power tool, such as an electric hand drill. The body section 1 also carries a planetary transmission comprising a plurality of planet elements 9, each of which is rotatably mounted on a fixed supporting shaft or pin 10 and positioned for driving engagement with the sun element 8. The pins 10, which extend into the body section 1 from the upper or outer end thereof, are preferably equi-angularly spaced about the axis of the sun element 8 and have their inner ends secured in an inner body member 11 which retains the planets 9 on their respective pins and thus becomes structurally integral with the assembly of the body section 1.

Also, the inner body member 11 has an axially extending hub 12 which extends into, and is rotatably journalled in, a counter bore 13 of the hub 4 of the second or lower body section 2. An axially extending bore 14 concentric with the sun-pinion 8 is formed in the hub 12 for slidably receiving the inner end of the shank 15 of a driven chuck member 16 which is carried by and projects axially outward from the end of the lower body section 2. If desired, the upper portion 16a can be tapered as at 16a to serve as a Morse taper to receive other kinds of chucks.

As shown, the side wall of the lower body section 2 extends upwardly beyond the inner body member 11 into substantially end-to-end engagement with the wall of the upper section 1, with little more than running clearance between them, and a ring member 17 is press-fitted into the open end of the lower section 2, above the inner body member 11, for driving engagement with the planets 9. Also, the inner body member has a peripheral radial portion 18 which extends beneath the inner end of the ring member 17, in close running relation therewith, and it is by this means that the upper and lower body sections are held together in independently rotatable relation. A suitable packing ring 19 is disposed between the adjacent ends of the two body section walls to seal the joint against entrance of dust or dirt to the transmission mechanism, or, as shown in Fig. 4, a suitable overlapped running fit can be used as shown at 19a.

Within the planetary transmission arrangement thus far described, one or the other of the body sections 1 and 2 may be caused to rotate, each in the direction opposite the other, by merely holding the section that is to remain stationary and for this purpose the peripheral surface of each body section is provided with small ribs, as at 20, or is knurled, to furnish a convenient hand-grip area. Thus with the shaft 7 turning in the right-hand or clockwise direction, when viewed from the outer end of the shaft, the upper section 1 will turn clockwise when the lower section is held, and the lower section 2 will turn counterclockwise when the upper section is held. This selective operation of the two body sections is used to drive a single tool, in either direction at the will of the operator, by providing a simple clutch means whereby the shank 15 of the tool chuck 16 may be operatively engaged with one section or the other, selectively, according to the direction it is desired to be driven.

In the form shown, the clutch means comprises a pair of lugs or wings 21, integral on the chuck shank 15 and projecting radially therefrom, and coating bayonet joint sockets 22 and 23 formed in the lower end of the inner body hub 12 and the bottom wall 24 of the lower body section 2 respectively. The lugs 21 are located a sufficient distance from the inner end of the shank 15 so that the shank will extend into the bore 14 of the hub 12 when the lugs are engaged in the slots 23 and the bore 14 is of sufficient depth to permit the shank to be shifted endwise to engage the lugs in the slots 22. Thus in either position the shank 15 will at all times be supported by both the wall of the bore 14 and by the wall of the passage 25, in the lower section, through which the shank extends outwardly to carry the tool 26. Also, as shown in Figs. 3 and 6, each of the slots 22 and 23 is undercut angularly in the direction opposite the direction of rotation of the respective part, to receive the lugs 21 and retain the shank 15 axially in the position to which it is set.

It will be understood that the chuck shank 15 is shifted manually between the upper and lower clutch sockets 22 and 23, respectively, for clockwise or counterclockwise drive, while the body sections 1 and 2 are at rest; the change being accomplished by merely turning the chuck shank in the opposite direction from that in which it has been driven, to release the lugs 21 from the undercut portions of the clutch sockets, and then shifting the shank axially to disengage the lugs 21 from the one clutch means and engage them with the other clutch means, meanwhile continuing to turn the chuck shank in the same direction until the lugs enter the sockets of the other clutch means and become locked in the undercut portions thereof.

A particular feature of the present invention is the construction and means whereby the body sections of the improved attachment are caused to be at rest, for shifting the chuck shank 15 from one clutch means to the other, without stopping the driving motor or rotation of the drive shaft 7. As shown, this is accomplished by providing an automatic disconnect of the drive shaft 7 from the transmission means 8, 9 and 17, which operates whenever there is no axial load on the driven tool 26. Thus, since the body sections 1 and 2 are driven only by way of the transmission means and the body sections will rotate only when an axial load is applied on the tool, the parts will come to rest automatically the moment that such load is released and the tool chuck can then be manipulated for change of direction or change of the tool.

In the form of the invention shown in Figs. 1 and 2, the planetary transmission means is constructed of conical elements arranged to engage each other frictionally for the transmission of power or motion, the arrangement being such that axial load applied through the drive shaft 7 will automatically produce driving frictional engagement of all of the transmission elements and a driving torque directly proportional to the load. As shown, the sun element 8 is in the form of a truncated cone mounted fast on the inner end of the drive shaft 7 and tapered inwardly to mate with similarly tapered planet elements 9 which, in turn, are disposed to mate with the inwardly tapered inner wall surface of the ring element 17. The planet elements 9 are loose on their supporting pins 10 and therefore axially inward pressure on the sun element 8 will force the planet elements 9 against the conical surface of the ring element 17 for driving frictional engagement therewith.

With this arrangement of the transmission, automatic disconnect of the driving force is obtained by providing a sufficient axial play between the inner end of the shaft bushing 6 and the outer end of the sun element 8 to permit axial shifting of the shaft 7, so as to disengage the sun element from the planets 9, and by providing means for normally urging the shaft 7 in the rearward or outward direction from the body member 1.

In the form shown, this last-named means comprises a compression spring 27 seated in a counter bore 28 at the inner end of the sun element 8 and bearing against a cup-shaped retainer 29 carried by the inner body member 11. To minimize friction, the retainer 29 is mounted on the outer race of thrust bearing 30, which in turn is seated in a counter bore 31 in the adjacent end surface of the inner body member 11, and, since the parts are all axially aligned with the shaft 7, the normal action of the spring 27 will be to shift the shaft rearwardly and keep the sun element 8 out of driving contact with the planets 9. Thus, except when the force of the spring is overcome by an applied axially inward load on the shaft 7, the transmissions will be inoperative to drive either of the body sections 1 and 2.

In the form of the invention shown in Figs. 4 and 5, the transmission is of the more or less conventional planetary gear type in which the sun element 8, directly engaging the planets 9, is a pinion gear and the planets 9 are idler gears providing driving connection with a ring element 17 in the form of an internal or ring gear.

In this arrangement, however, the sun gear 8.1 is not directly mounted on the drive shaft 7, but rather is a secondary element provided with an enlarged cylindrical head 32 having a conically counter-bored concentric seat 33 adapted to receive and mate with the primary sun element 8 mounted fast on the drive shaft 7.

As shown, the primary sun element 8 is an inwardly tapered truncated cone adapted to frictionally engage the side wall of the seat 33 and thereby drive the secondary element 8.1. Also, sufficient axial space is provided between the outer end of the primary element 8 and the inner end of the bushing 6 to permit axial shifting of the shaft 7 for moving the element 8 into and out of driving engagement with the head 32; and a compression spring 34, seated in a counter-bore 35 in the end of the element 8 and bearing against a ball seat 36 at the bottom of the seat 33, is provided to normally urge the shaft 7 rearwardly and hold the element 8 out of driving engagement with the head 32, except when an axial load sufficient to overcome the spring 34 is applied on the shaft 7. As shown, the head 32 is freely journalled in a counter-bore 37 in the hub 3 of the first or upper body member 1 and is thereby retained in concentric relation with the shaft 7 so that the load transmitted to the planets 9 by the secondary sun element 8.1 will always be uniformly distributed. Also, the inner end or hub portion of the secondary element 8.1 is made to project axially beyond the teeth thereof and is rounded, as at 38, to provide a thrust bearing on the surface of the inner body member 11 and sustain the reaction to the axial load applied to the element 8.1 when the transmission is in operation.

The principal advantages of my improved reversible-drive attachment reside in the fact that rotation of the driven parts occurs only when the device is under an applied axial load; and in the fact that the driven tool can be shifted for drive and in either direction, or may be removed and replaced, without stopping the driving motor. Other advantages will be found in the automatic cessation of driving power to the driven parts whenever load on the tool is released; and in the fact that the delivered torque, in either direction of the driven tool, is directly proportional to the applied load.

Still further advantages reside in the simple construction of the improved attachment; in the simple arrangement of parts for the automatic disconnect feature; and in the fact that all of the elements can be readily manufactured and assembled at a relatively low cost.

Although but two specific embodiments of this invention have been herein shown and described, it will be-

I claim:

1. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotably journaled in the passage of the first section, a drivable ring element fast on the interior of said second section, a plurality of angularly spaced rotatable planet elements mounted on said first section for driving engagement with said ring element, a sun element mounted fast on the inner end of said drive shaft, and means for effecting driving relation between said sun element and said planet elements upon axially inward shifting of the drive shaft relative to the first body section.

2. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journaled in the passage of the first section, a drivable ring element fast on the interior of said second section, a plurality of angularly spaced rotatable planet elements mounted on said first section for driving engagement with said ring element, a sun element mounted fast on the inner end of said drive shaft, means for effecting driving relation between said sun element and said planet elements upon axially inward shifting of the drive shaft relative to the first body section, and means for normally urging said drive shaft in the axially outward direction.

3. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journaled in the passage of the first section, a ring element fast on the interior of said second section and having a conical axially concentric internal wall surface, a plurality of angularly spaced conical planet elements rotatably mounted on fixed axes on said first section and drivably mating with the conical surface of said ring element, means for drivably connecting said drive shaft with said planet elements upon axially inward shifting of the drive shaft relative to the first body section, and means normally urging the drive shaft in the axially outward direction.

4. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journaled in the passage of the first section, a ring element fast on the inetrior of said second section and having a conical axially concentric internal wall surface, a plurality of angularly spaced conical planet elements rotatably mounted on fixed axes on said first section and drivably mating frictionally with the conical surface of said ring element, a conical sun element on the inner end of said drive shaft for frictionally and drivably engaging said planet elements upon axially inward shifting of said drive shaft, and resilient means for normally holding said sun element out of engagement with said planets.

5. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journaled in the passage of the first section, a ring element fast on the interior of said second section and having a conical axially concentric internal wall surface tapering forwardly away from the first section, a forwardly tapered conical sun element fast on the inner end of said drive shaft, a plurality of angularly spaced planet elements rotatably mounted on fixed axes on said first section and drivably engaged frictionally with said ring element, said drive shaft being axially shiftable inwardly to frictionally engage said sun element in driving relation with said planets, and resilient means normally urging said drive shaft outwardly for holding said sun element out of engagement with said planets.

6. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journaled in the passage of the first section, a ring element fast on the interior wall of said second section and having a conical axially concentric internal wall surface tapering forwardly away from the first section, a forwardly tapered conical sun element fast on the inner end of said drive shaft, a plurality of angularly spaced planet elements rotatably mounted on fixed axes on said first section and drivably engaged frictionally with said ring element, said drive shaft being axially shiftable inwardly to frictionally engage said sun element in driving relation with said planets, an inner body member mounted on said first section in fixed relation therewith and forwardly of said planet elements, and resilient means reacting axially between said inner body member and said sun element for normally urging said drive shaft outwardly and disengaging said sun element from the planet elements.

7. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journaled in the passage of the first section, an internal ring gear fast on the interior wall of said second section, an inner body member mounted on said first section in fixed axially spaced relation with the inner end thereof, a plurality of planet gears rotatably mounted on fixed axes on said first section between the inner end thereof and said inner body member and drivably engaged with said ring gear, a sun gear rotatably mounted on said first section and drivably engaged with said planet gears, said sun gear having a hub portion bearing axially against the adjacent face of said inner body member, clutch means on the inner end of said drive shaft for drivably engaging said sun gear upon axially inward shifting of said sun gear and said clutch means and normally urging said drive shaft outwardly for holding said clutch means disengaged from said sun gear.

8. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journalled in the passage of the first section, a drivable ring gear element secured on the interior of said second section, a planetary transmission including planet gears mounted on the first section and drivably engaged with said ring element, a sun gear element disposed in mesh with said planet gears, means for drivably connecting said drive shaft with said planetary transmission including mating friction conical faces on said drive shaft and sun gear element engageable upon axially inward shifting of the drive shaft relative to the first body section and resilient means urging separation of said drive shaft and sun gear element at said conical faces.

9. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journalled in the passage of the first section, a drivable ring element fast on the interior of said second section, a planetary transmission mounted on the first section and drivably engaged with said ring element, means for drivably connecting said drive shaft with said planetary transmissions upon axially inward shifting of the drive shaft relative to the first body section, and means for normally urging said drive shaft in the axially outward direction, a driven shaft having radially extending lugs axially shiftable in the axial passage of said second section, said first section having connected thereto an inner body defining axially spaced recesses receiving said lugs alternately in rotary drive relationship for rotation of the drive shaft in two directions selectively.

10. A device of the class described comprising first and second body sections mounted together end-to-end for rotation, one relative to the other, about a common axis, each of said sections having an axial passage therethrough and the second section having a hollow end portion opening toward the first section, an axially shiftable drive shaft rotatably journalled in the passage of the first section, an axially shiftable driven shaft rotatably journalled in the passage of the record section, an internal ring gear fast on the interior of said second section, a plurality of planet gears rotatably mounted on fixed axes on said first section and drivably engaged with said ring gear, a sun gear rotatably mounted on said first section and drivably engaged with said planet gears, clutch means on the inner end of said drive shaft for drivably engaging said sun gear upon axially inward shifting of said drive shaft, resilient means normally urging said drive shaft outwardly for holding said clutch means disengaged from said sun gear and means for selectively engaging the driven shaft with the first section and the record section, the last means including interlocking elements on said driven shaft and record section obstructing relative axial movement between said driven shaft and the record section under axial end thrusts during rotation of the driven shaft.

11. A device of the class described comprising first and second body sections mounted together end-to-end for rotation, one relative to the other, about a common axis, each of said sections having an axial passage therethrough and the second section having a hollow end poriton opening toward the first section, an axially shiftable drive shaft rotatably journalled in the passage of the first section, an axially shiftable driven shaft rotatably journalled in the passage of the second section, means releasably interconnecting said driven shaft and second section against relative axial movement while said second section is rotating, a drivable ring element fast on the interior wall of the hollow end portion of said second section, an inner body member mounted on said first section in fixed axially spaced relation with the inner end thereof, a plurality of angularly spaced planet elements rotatably mounted on fixed axes on said first section between the inner end thereof and said inner body member and drivably engaged with said ring element, means for drivably connecting said drive shaft with said planet elements upon axially inward shifting of the drive shaft relative to said first body section, and means reactably supported by said inner body member for normally urging said drive shaft in the axially outward direction.

12. A device of the class described comprising first and second body sections mounted together end-to-end for rotation, one relative to the other, about a common axis, each of said sections having an axial passage therethrough and the second section having a hollow end portion opening toward the first section and receiving the lower end of said first section in journalled telescoping relationship to define between them an annular space bounded axially by axially recessed circular walls, an axially shiftable drive shaft rotatably journalled in the passage of the first section, an axially shiftable driven shaft rotatably journalled in the passage of the second section and having lugs disposed in said annular space receivable in the axial recesses of said circular walls, a drivable ring element on the interior wall of said second section, an inner body member mounted on said first section in fixed axially spaced relation with the inner end thereof, said inner body member having a peripheral portion radially overlapping the inner end of said ring element for holding said first and second sections in assembled end-to-end relation, a plurality of angularly spaced planet elements rotatably mounted on fixed axes on said first section between the inner end thereof and said inner body member and drivably engaged with said ring element, means for drivably connecting said drive shaft with said planet elements upon axially inward shifting of the drive shaft relation to said first body section, and means reactably supported by said inner body for normally urging said drive shaft in the axially outward direction.

References Cited in the file of this patent

UNITED STATES PATENTS

| 1,154,769 | Hertzberg | Sept. 28, 1915 |
| 1,201,364 | Shelton | Oct. 17, 1916 |
| 1,493,160 | Pierce | May 6, 1924 |
| 2,092,598 | Blair | Sept. 7, 1937 |
| 2,501,386 | Gibbs | Mar. 21, 1950 |

FOREIGN PATENTS

| 450,969 | Germany | Oct. 18, 1927 |